Dec. 8, 1964  F. MOSCARINI  3,160,463
DEVICE FOR TAKING AND RECORDING THE PERFORMANCE
DATA OF A RUNNING MOTOR VEHICLE
Filed April 25, 1962  5 Sheets-Sheet 1

Flaviano Moscarini
INVENTOR

BY Wenderoth, Lind & Ponack,
ATTORNEYS

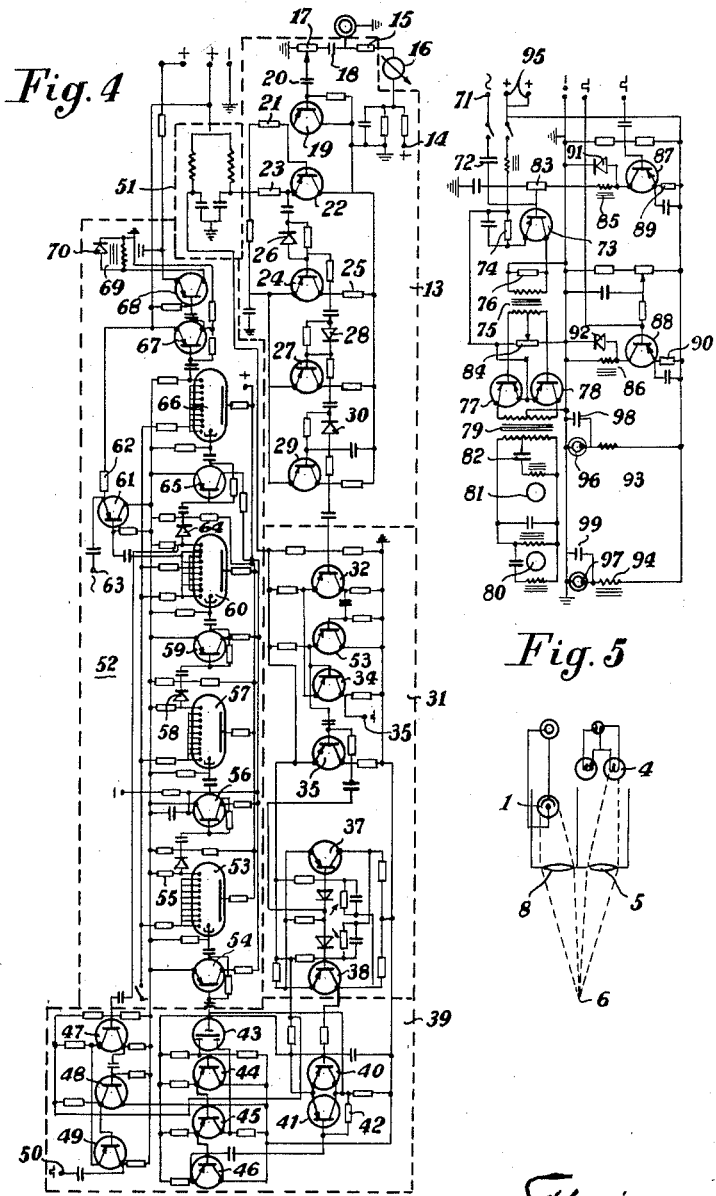

Dec. 8, 1964  F. MOSCARINI  3,160,463
DEVICE FOR TAKING AND RECORDING THE PERFORMANCE
DATA OF A RUNNING MOTOR VEHICLE
Filed April 25, 1962  5 Sheets-Sheet 3

Flaviano Moscarini
INVENTOR

BY Henderoth, Lind & Ponack,
ATTORNEYS

Dec. 8, 1964    F. MOSCARINI    3,160,463
DEVICE FOR TAKING AND RECORDING THE PERFORMANCE
DATA OF A RUNNING MOTOR VEHICLE
Filed April 25, 1962    5 Sheets-Sheet 5

Flaviano Moscarini
INVENTOR

BY Wenderoth, Lind & Ponack,
ATTORNEYS

United States Patent Office 3,160,463
Patented Dec. 8, 1964

3,160,463
DEVICE FOR TAKING AND RECORDING THE PERFORMANCE DATA OF A RUNNING MOTOR VEHICLE
Flaviano Moscarini, Rome, Italy, assignor to Editoriale Domus S.p.A., Rome, Italy
Filed Apr. 25, 1962, Ser. No. 190,097
Claims priority, application Italy, July 25, 1961, 60,282, Patent 13,494
2 Claims. (Cl. 346—33)

The object of the present invention is a device for taking and recording the performance data of a running vehicle.

One object of the present application is to provide a device for recording the performance data of a running motor vehicle having conventional brake, acceleration and clutch pedals, comprising in combination with a plurality of reflecting elements located at known distances transversely to the road to be travelled by the vehicle, a casing arranged on the front portion of the vehicle and including a light source emitting the light in the direction of said reflecting elements and a photoelectric cell energized by the light rays reflected from said reflecting units, a recording unit within the vehicle connected with said photoelectric cell and at least one of said pedals, electronic chronometrical means for processing the signals furnished from said photoelectric cell and transmitting them to said recording unit, whereby said recording unit records the time succession of said reflecting elements and the effects of said pedals on the run of the vehicle.

A further object is to provide said recording unit with a first electromagnet energized by the signals transmitted from a first terminal of said electronic chronometrical unit, a second electromagnet energized by the signals transmitted by a second terminal of said chronometrical unit, a third electromagnet energized by operating one of said control pedals, a fourth electromagnet energized by operating another control pedal, a printing roller rotatably arranged above said strip, control means for driving said strip and said printing roller, an inking pad for inking said printing roller, a plurality of printing levers each connected to one of said electromagnets for raising said strip in contact with said printing roller at the energization of said electromagnets both by said chronometrical unit and control pedals, whereby on said strip trace lines will be printed having the indications of the effects of said control pedals in relation to the time succession of said reflecting elements recorded on said strip.

The purpose of the present invention is that of embodying a device of the concerned kind which is free from the accidental and systematic errors and allowing the precise detection and recordal of both the physical values inherent to the run of the vehicle, and of the indicative data concerning the drive mode of the vehicle. According to this invention, a device is provided comprising, in combination, a photoelectric cell mounted on the vehicle and destined to be energized by the reflection of a scanning ray on a plurality of reflecting elements located along the path of the vehicle at known distances, a chronometric unit destined to trace on a recording strip a time base with a pre-established graduation, a recording unit comprising means to advance said strip at constant speed and means to transduce the energizing of the photocell and the operation of one or more driving members of the vehicle into corresponding records selectively marked on said strip, and related to said time scale.

This invention will be hereinafter described with reference to the attached drawings which show only by way of nonlimitative example one preferred embodiment of this invention.

In the drawings:

FIGURE 1 diagrammatically shows the use of the device;

FIGURE 4 shows the general diagram of the chronometric unit associated to the photosensitive element.

FIGURE 5 shows the diagram of the recording unit;

Figure 1:
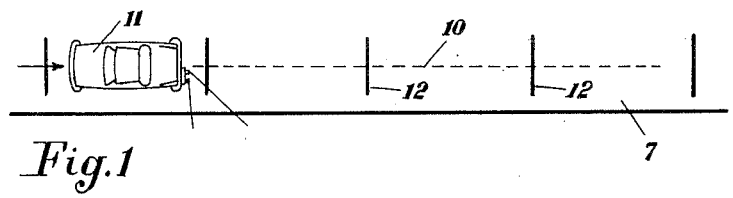
Figure 2:
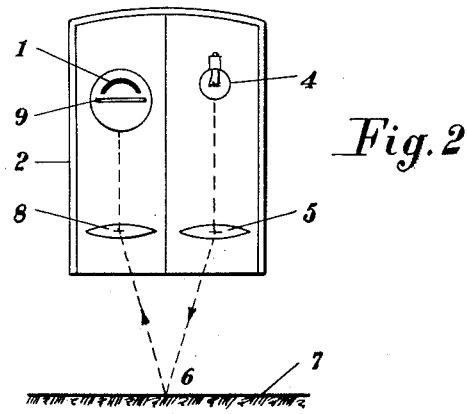
FIGURE 2 is a diagrammatical cross sectional view of the photo-sensitive element.
Figure 3:
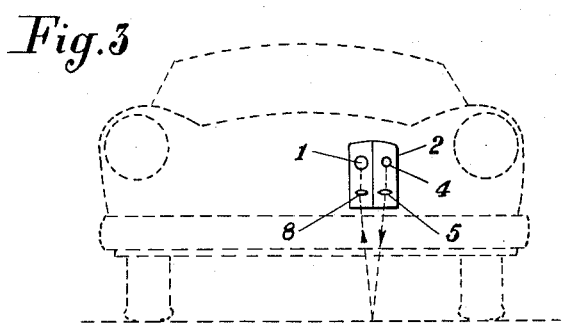
FIGURE 3 shows the mounting of the element of FIGURE 2 on the motor vehicle.

With reference to FIGURES 1 to 3, the photosensitive element for instance a photoelectric cell 1, mounted within a protective casing 2 is located in the front portion of the vehicle as shown in FIGURE 3, so that the scanning ray supplied by a luminous source 4 and passing through an optical system 5 will be directed onto the point 6 of the featheredge 7. If in the point 6 the scanning ray is reflected onto the optical system 8 focused on the cathode 9 of the cell 1, the latter will be energized and thus the practical embodiment of the device according to this invention, as shown in FIG. 1 provides the arrangement on the featheredge 7, along the path 10 of the vehicle 11, of a set of reflecting and/or refracting signals 12 located at known intervals and preferably equally spaced apart. The signals 12 are practically formed by pressure sensitive stripes of reflecting and/or refractory material, or by suitable paint or any other technologically suitable material. When the vehicle 11 will move along the path 10, a sequence of energizing actions will be obtained for the photocell 1, due to the passage of the scanning ray on the signals 12. Said energizations are recorded on a recording strip whereon a chronometric unit, which will be described in detail later on, will trace an exact scale of times. Thus an exact record of the distances travelled and of the associated travel times will be available, allowing thus the graphs inherent to the run of the vehicle to be traced.

For amplifying the photoelectric signal, the unit denoted 13 in FIG. 4 is provided. From the voltage divider supplied at the terminal 14 is obtained a voltage of about 90 v., positive with respect to the mass of the apparatus. This voltage supplies the photoelectric cell 1 through the load resistor 15 of said cell. The current of the cell 1 is directly indicated by the microammeter 16 located on the outer board. The electric signal supplied by the cell is sent to the adjusting potentiometer 17 for the sensitivity which has a logarithmic variation, through the coupling capacitor 18. The signal derived by the potentiometer slider is applied to the base of the first transistor 19 through the coupling capacitor 20. This first transistor 19 has its collector connected to mass and a very high load emitter resistance 21 allowing thus a very high input resistance higher than one MΩ to be obtained; the signal thus will not be voltage amplified (on the contrary it will be slightly reduced) but the arrangement allows a power gain sufficient to feed the base of the second transistor 22 which also operates with its collector connected to ground with a further power gain as the base resistance of the latter is reduced. This feeds the input impedance of the third transistor 24 which operates with grounded emitter with a high collector load 25. This circuit ensures a voltage gain and as the coupling to the preceding stage is obtained by a germanium diode 26 it will be able to amplify only the negative pulses supplied by the cell 1, and in other words it will be sensitive only to the positive changes of luminosity. In fact the first two stages will effect no phase reversal of the signal. This third stage has on the contrary a grounded emitter and operates a phase reversal so that it supplies positive pulses to the fourth stage 27.

Also in the coupling between the third and the fourth stage a germanium diode is inserted so that only the positive pulses can reach the base of the fourth transistor 27.

The fourth transistor has a grounded emitter, the output pulses from this stage are voltage amplified negative pulses. The fourth transistor is coupled to the subsequent and last stage 29 with grounded emitter, by a germanium diode 30 allowing only the negative pulses to reach the base of the fifth stage the output of which, due to the reversal, will consist of only positive pulses.

A monostable multivibrator consisting of three transistors 32–33 and 34 is mounted on the board 31. In this multivibrator between the first transistor 32 and the third transistor 34, forming the actual multivibrator, a third transistor 33 is inserted into a circuit having its collector grounded allowing the obtainment (with the high load resistance on the emitter) the high base impedance indispensable to reach pulses having the duration of 50 milliseconds at the output terminal 35. The fourth transistor 36 serves the purpose of generating, due to the effect produced by the monostable multivibrator, the control pulse for the bistable multivibrator consisting of two other transistors 37 and 38. The switch circuit for the standard sample signal, the quartz controlled generator for the sample signal and the monostable multivibrator which generates the time marks are mounted onto the panel 39. The switch consists of two transistors having grounded emitters and collectors in parallel i.e. with a common load 42. As the base of the first transistor 40 is connected to the collector of the transistor 38 of the bistable multivibrator as previously described, the second transistor 41 will be capable of either amplifying, or not amplifying, the sample signal delivered to its base, depending upon the status of the transistor of the bistable multivibrator connected to the first switch transistor. The generator for the sample signal is a quartz piloted oscillator, obtained with sole transistors and pure resistances. The quartz 43 is a crystal which operates on torsion resonance frequencies of 10 kHz. and is inserted as a selective tetrapolar network between the output and the input of a two stage transistorized amplifier 44 and 45 comprising the direct coupling transistors the first of which operates with grounded collector and the second with grounded emitter in counter-reaction to the emitter. The third transistor 46 of this circuit serves the purpose of an impedance adapter between the generator and the switch.

The multivibrator generating the time pulses with a recurrence frequency of 10 cycles for second is a monostable multivibrator quite similar to that generating the space pulses and it also consists of three transistors 47, 48 and 49. The transistor 48 has its collector grounded to allow the insertion of the high time constant necessary to obtain the 50 milliseconds for the duration of the negative pulse applied to the terminal 50.

On the panel 51 are mounted two supply filters in order to prevent the possible noises coming from the source circuit from reaching the photoelectric amplifier and the several signal generating circuits.

On the panel 52 is mounted the decade and second counting circuit. To the first decade 53 the signal is supplied with a recurrence frequency of 10,000 cycles/ sec. through an amplifier embodied with the transistor 57 having its emitter grounded and its base energized by the output signal from the switch, if the case may be. The signal coming from this transistor 54 is therefore formed by negative 55+60 v. pulses and is applied to the auxiliary cathodes of the first decade.

From the main cathode No. 0 of the first decade a 4+6 v. positive pulse is derived (by means of the diode 55 which is biased at +2 v.) having the duration of 0.1 msec. and with the recurrence frequencies of 1000 cycles/sec.

This signal will be amplified by the second transistor 56 having its base grounded and sent under the form of 55+60 v. negative pulses having an equal duration and recurrence frequency to the auxiliary cathodes of the second decade 57. From the main cathode 0 of the second decade is derived a 4+6 v. positive pulse (through the diode 58 polarized at +2 v.) having the duration of 1 msec. and with the recurrence frequency of 100 cycles/sec.

This signal is amplified by the third transistor 59 having its base grounded and sent under the form of −55+60 v. having equal duration and recurrence frequency to the auxiliary cathodes of the third decade 60. This third decade 60 has its main cathodes connected alternately to one another apart from the No. 0. Therefrom from the main cathodes having an odd number connected with each other an about 6+8 v. positive, signal will be obtained with the duration of about 20 milliseconds and with a recurrence frequency of 50 Hz., and thus a square wave $f=50$ Hz. which is applied to a transistor 61 having its collector grounded and a low resistance emitter 62 which supplies at an adequate power level the signal to the terminal 63.

From the main cathode No. 0 of said third decade is delivered through the diode 64, which is biased at +2 v., a +4+6 v. pulse having the duration of 10 milliseconds at the recurrence frequency of 10 cycles/sec.

This signal will be amplified by the fourth transistor 65 having its emitter grounded and sent under the form of −55+60 v. pulses having equal duration and recurrence frequency to the auxiliary cathodes of the fourth decade 66 from the main cathode No. 0 is derived a 6+8 v. positive pulse having the duration 0.1 sec. with the recurrence frequency of a cycle sec.

The polarity of this pulse is reversed by the transistor 67 to the base of which it has been sent, as this transistor operates with a grounded emitter and serves to periodically unlock at the recurrence frequency and for the aforesaid duration the power transistor 68 the collector current of which energizes the control electromagnet of the second-meter 69. From the winding of the second-meter 69 is parallel derived the silicon diode 70 to prevent any over-voltage from being formed in correspondence of the steep fronts of the energized pulses. This recording unit (FIG. 5) is provided with an entirely transistorized electronic circuit whch feeds the motors for drving the paper, for inking and for rewinding the paper and the printing electromagnets. For feeding the motors the used circuit is a power synchronous converter piloted by the 50 Hz. square wave produced by the generator and supplied to the terminal 71 of the connector. This 50 Hz. signal is applied from the terminal 71 through a high capacity 72 to the base of the pilot transistor 73 operating with a grounded emitter biased by the resistor 74 for stabilizing the temperature.

Said transistor has a collector load formed by the transformer 75 coupling to the power stage. The primary of the transformer is loaded by a parallel resistor 76 for the impedance adaptation and the two sections of the secondary are connected to the bases of the two power transistors 77 and 78 so as to feed said secondary with signals in push pull. The two power transistors 77 and 78 operate as switches between cut off and saturation.

Thus on the secondary 79 are available the voltage for feeding the synchronous motor 80 for driving the paper and the voltage for feeding the synchronous motor 81 for the inking operation and for driving the paper.

The phase of the motor 81 is phase reset by the series capacitor 82. The adjustment 83 for the base bias of the pilot transistor 73 and of the base bias 84 for the power transistors 77 and 78 are provided for the possibility of their replacement.

The printing electromagnets 85 and 86 are energized by the current of the two transistors 87 and 88 which have a common emitter biased by the resistors 89 and 90 for stabilizing the temperature. The two circuits are similar to one another and to the bases of said transistors are applied the signals coming from the terminals 35 and 50 of the generator shown in FIG. 4. Also these transistors have an adjustable base bias allowing the replacement thereof and the adjustment of the energizing current for the printing electromagnets.

The printing electromagnets 85 and 86 fed by the aforesaid transistors 87 and 88 are in parallel with the silicon diodes 91 and 92 in order to prevent any overvoltage from being formed in correspondence with the steep fronts of the energizing pulses.

The printing electromagnets are on the contrary directly fed by the general supply from the terminals 95 through the switches which can be connected to the connectors 96 and 97 wherefrom are derived the capacitors 98 and 99 for damping the switch transistors.

Figure 6:
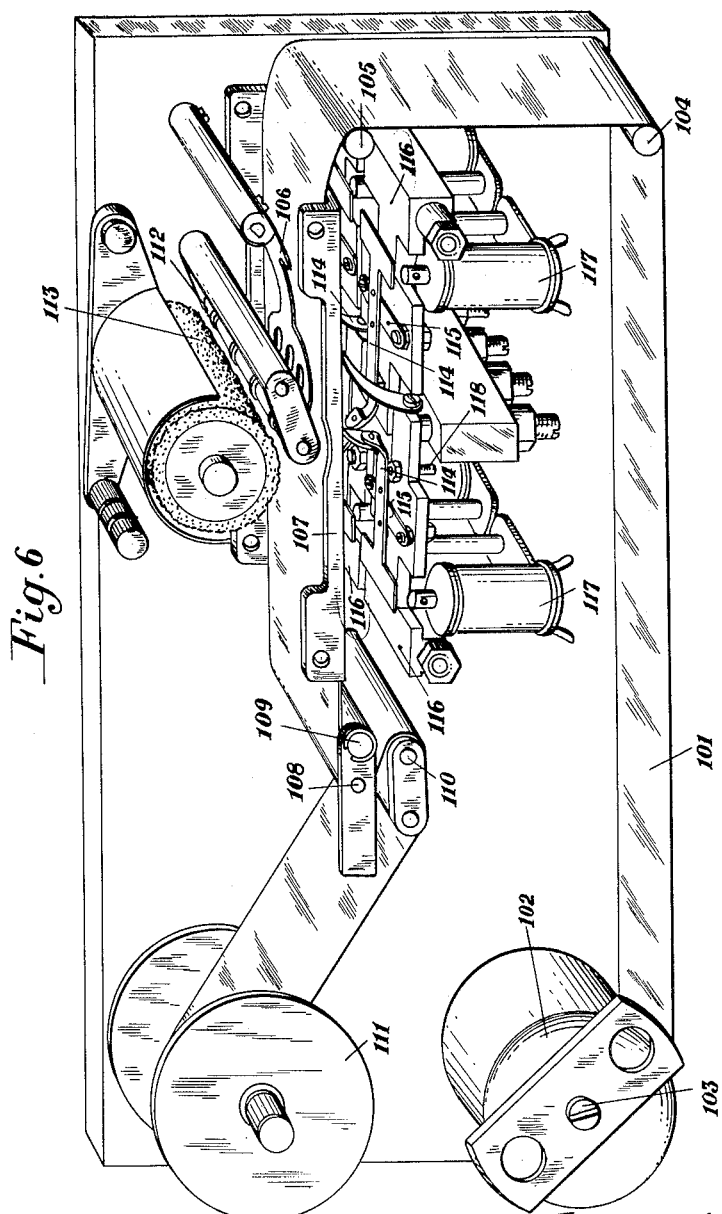
FIGURE 6 shows an axonometric view of the mechanical unit for advancing and tracing the recording strip.

In FIG. 6 by way of example has been shown the mechanical arrangement of the recording members.

The paper strip 101 which is wound in the roll 102 is mounted on the support 103 wherefrom it is unwound under a tractive action while braked by a presser roller. The moving strip passes over the idler rollers 104 and 105 and glides while pressed by the spring 106 on the support plate 107 wherefrom said strip comes on an idler roller 108 oscillating about a pivot 109 and then to the driving roller 110 which is provided with needle teeth.

The zone driven by the toothed roller 110 is then wound on the rewinding roller 111. The strip gliding on the support plate 107 moves between said plate and the roller 112 inked by the inking pad 113. On the support plate 107 in register with the inked roller 112 a slot is provided. From said slot project the upwards moving ends of the printing levers 114 which are pivoted on the torsion springs 115 fixed to the orientable supports 116. On said orientable supports are fixed also the printing electromagnets 117 and the adjusting screws 118 for the stroke of the levers. The inking roller is moved by an electric motor 119 shown in FIG. 7, through a suitable speed reduction effected by a suitable ratio between the driving pinion 120 and the gear 121 of FIG. 8. The rotation of the inked roller with a further reduction by means of the pinion 122 and the gearing 123 of FIG. 8 controls by means of the pulleys 124 and 125 and the friction belt 126 the rotation of the re-winder 111 of FIG. 6.

Figure 7:
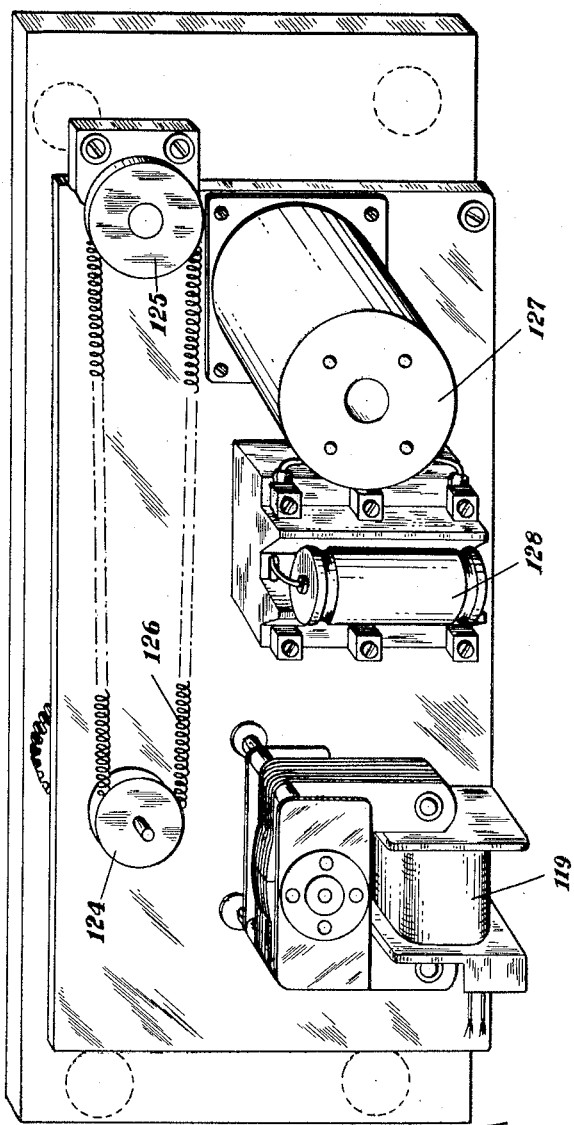
FIGURE 7 is a rear view of the unit of FIGURE 6.

The toothed driving roller 110 is rotated by the biphase synchronous motor 127 shown in FIG. 7 where is also illustrated the rephasing capacitor 128 of the second phase of said motor.

Figure 8:
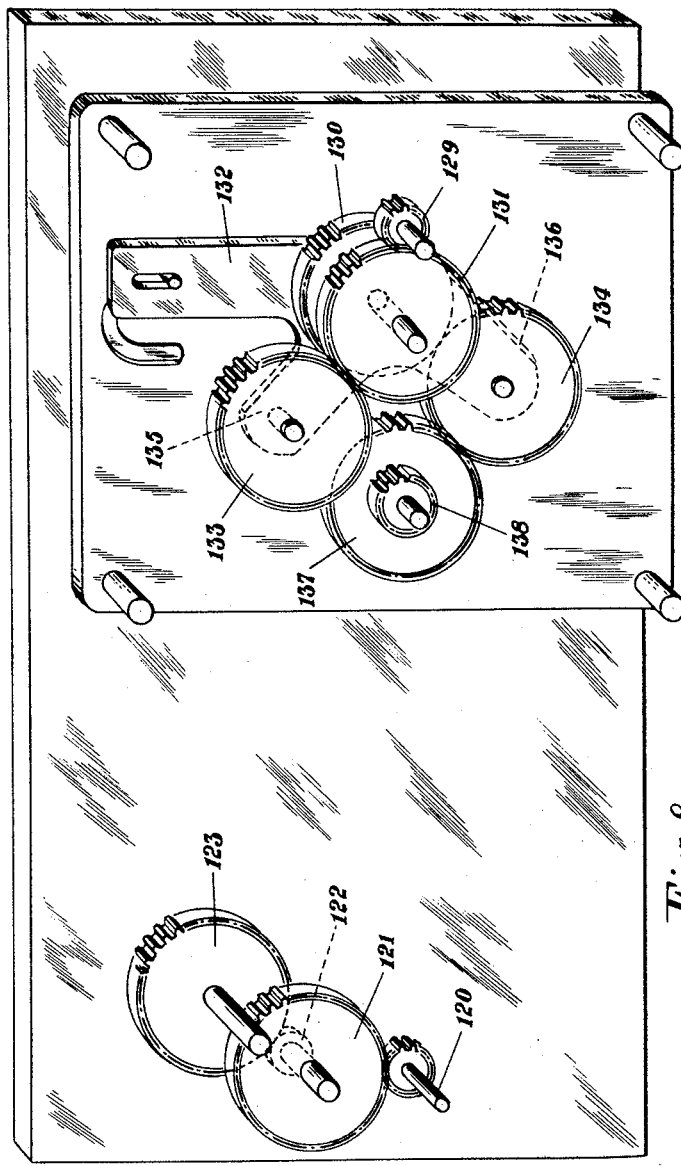
FIGURE 8 is the reduction unit associated to the advancing system.

Between the aforesaid motor and the driving toothed roller 110 is interposed a two speed gearing down device as shown in FIG. 8. In said FIG. 8 the pinion 129 is rigid with the motor 127 and drives with a speed reduction the gears 130 and 131 rigid with one another and coaxially pivoted on the pivoting center of the control lever 132. The two gear 130 and 131 rigid with one another, drive the two gears 133 and 134 respectively, which being mounted on the two arms 135 and 136 of the control lever 132 are capable of coming into contact respectively with the gear 137 or the gear 138 (both rigid with the spindle moving the toothed roller) depending upon the position of the aforesaid lever control lever 132.

With reference to the FIG. 6 the operation occurs as follows:

The synchronous motor 119 drives the toothed roller 110 actuating the paper strip so that the strip 101 moves from the supply roller and passes between the upwards moving ends of the printing levers 114 and the inked roller 112 which rotates driven by the asynchronous motor 127.

When one of the two printing electromagnets 117 is energized as disclosed in connection with the FIG. 5, the strip passing over the upwards moving end of the lever of said electromagnet is carried into contact with the inking roller 112 and removes the ink therefrom, said ink being deposited under the form of a rectilinear trace having its length defined by the forward speed of the strip multiplied by the duration of the energizing of the electromagnet. The inker 112 is supplied with ink from the rotary pad 113 which continuously rotates by contacting the inker.

One of the printing levers 114 controlled by the unit 39 of FIG. 5, traces on the strip 101 a scale of times consisting of a sequence of equally spaced apart lines; assuming for instance that the lines will be repeated at a recurrence frequency of $1/10$ sec. with an interval of one centimetre, it will be possible to effect readings of the order of one hundredth of one second. Another lever 114 traces on the strip 101 the pulses from the photocell 1 corresponding to the passage on the signals 12 of FIG. 1, and the other levers 114 connected to suitable energizing circuits, are connected to corresponding drive members of the vehicle, such as for instance the clutch pedal and the brake pedal. Thus it will be possible to obtain, always with reference to the aforesaid scale of time, the graph concerning the drive unclutching operations and the braking operations.

The ink trace is produced by raising the paper strip by the lever of the electromagnet until contacting the roller 112, whereby the paper strip will receive an ink trace, the length of which is the greater the longer is the time during which the paper strip contacts the roller and thus, the length of the ink line corresponds to the speed of the paper strip multiplied by the time duration of the contact between the strip and inking roller.

The electromagnets are energized in the manner as described with reference to FIGURE 5.

The electromagnets 93 and 94 are energized by closing the contacts of the connectors by means of the switches connected to the control devices of the vehicle (as the clutch, accelerator pedal and brake pedal) for recording how and when such devices have been operated during the measuring tests and thus to have the indication of the braking and accelerating effects. The electromagnet 85 is energized by the transistor 87 by the signals transmitted to the terminal 35 of FIGURE 5. Thus, on the paper strip a marking is recorded in correspondence to any one of the reflecting elements provided on the test road.

The electromagnet 86 is energized by the transistor 88 through the signals at the terminal 63 so as to mark the strip and to indicate thus the time passing from one to another recorded marking in relation to the path travelled by the vehicle.

With regard to the relationship between the pedals and the reflecting strips on the road, it is to be noted that on the recording strip there are recorded a succession of signals reflected by the road strips through the photocell and processed by the electronic means and trace lines indicating the operation of single pedals. Thus, from the recording strip it will be easily possible to read out the effects of said pedals on the behavior of the vehicle.

Summarizing, it will be possible to have indications recorded on said strip relating to the accelerating and braking effects and to the precise instants of gear changing.

The present invention has been illustrated and described in one preferred embodiment being however understood that constructive changes may be practically adopted without departing from the scope of the present invention.

I claim:

1. A device for recording the performance data of a running motor vehicle having conventional brake, acceleration and clutch pedals, comprising in combination with a plurality of reflecting elements located at known distances transversally to the road to be travelled by the vehicle, a casing arranged on the front portion of the vehicle and including a light source emitting the light in direction of said reflecting elements and a photoelectric cell energized by the light rays reflected from said reflecting units, a recording unit within the vehicle connected with said photoelectric cell and at least one of said pedals, electronic chronometrical means for processing the signals furnished from said photoelectric cell and transmitting them to said recording unit, whereby said recording unit records the time succession of said reflecting elements and the effects of said pedals on the run of the vehicle.

2. A device as claimed in claim 1, wherein said recording unit comprises a first electromagnet energized by the signals transmitted from a first terminal of said electronic chronometrical unit, a second electromagnet energized by the signals transmitted by a second terminal of said chronometrical unit, a third electromagnet energized by operating one of said control pedals, a fourth electromagnet energized by operating another control pedal, a printing roller rotatably arranged above said strip, control means for driving said strip and said printing roller, an inking pad for inking said printing roller, a plurality of printing levers each connected to one of said electromagnets for raising said strip in contact with said printing roller at the energization of said electromagnets both by said chronometrical unit and control pedals, whereby trace lines will be printed on said strip having the indications of the effects of said control pedals in relation to the time succession of said reflecting elements recorded on said strip.

References Cited by the Examiner

UNITED STATES PATENTS 2,718,448  9/55  Powers _____ 346—18
2,750,583  6/56  McCullough _____ 250—106

LEYLAND M. MARTIN, *Primary Examiner.*

LEO SMILOW, *Examiner.*